(12) United States Patent
Dahlman et al.

(10) Patent No.: US 6,907,005 B1
(45) Date of Patent: Jun. 14, 2005

(54) FLEXIBLE ARQ FOR PACKET DATA TRANSMISSION

(75) Inventors: Erik Dahlman, Bromma (SE); Stefan Parkvall, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1053 days.

(21) Appl. No.: 09/621,672

(22) Filed: Jul. 24, 2000

(51) Int. Cl.[7] .............................................. G01R 31/08
(52) U.S. Cl. ...................... 370/236; 370/252; 370/310
(58) Field of Search ................................ 370/236, 252, 370/310, 389, 392, 420, 432, 471, 395.52, 413, 415, 417, 516, 517, 519

(56) References Cited

U.S. PATENT DOCUMENTS

| | | | |
|---|---|---|---|
| 4,841,526 A | 6/1989 | Wilson et al. | |
| 5,063,562 A | 11/1991 | Barzilai et al. | |
| 5,701,311 A | 12/1997 | Kapoor | |
| 5,974,028 A | 10/1999 | Ramakrishnan | |
| 6,205,498 B1 | 3/2001 | Habusha et al. | |
| 6,700,893 B1 * | 3/2004 | Radha et al. | 370/412 |
| 6,711,180 B1 * | 3/2004 | Delesalle et al. | 370/474 |

FOREIGN PATENT DOCUMENTS

| | | |
|---|---|---|
| WO | 96/36150 A | 11/1996 |
| WO | 00/57594 A | 9/2000 |

OTHER PUBLICATIONS

*1999 IEEE 49th Vehicular Technology Conference*, vol. 3, May 16–20, 1999, pp. 2174–21278, XP002902250, Houston Texas, USA, ISBN: 0–7803–5565–2, Fan et al., "Adaptive timer selective repeat ARQ protocol for dynamic satellite constellations with intersatellite links".

(Continued)

*Primary Examiner*—Phirin Sam
(74) *Attorney, Agent, or Firm*—Nixon & Vanderhye P.C.

(57) ABSTRACT

The present invention provides a flexible ARQ scheme. A communications channel is set up between a transmitter and a receiver. A value is selected for an ARQ parameter for data packets to be transmitted over the communications channel. The ARQ parameter value may be selected in accordance with a trade-off between a desired performance or goal, e.g., a specific throughput of data packets transmitted over the communications channel, and one or more communication resources required to support the desired performance or goal. An example of an ARQ parameter is a number of outstanding data packets to be acknowledged by the receiver before more packets can be sent to the receiver. Another parameter example is a delay associated with the ARQ scheme. In a preferred, non-limiting example embodiment, first and second ARQ parameter values are selected for a desired trade-off. Accordingly, a specific number of outstanding data packets to be acknowledged by the receiver and an acknowledgement or retransmission delay can be selected to achieve a desired performance, e.g., a desired throughput of data packets, at a particular resource cost. Because of the flexibility provided by the present invention, a communications device may set its own objectives for a particular connection based upon one or more performance requirements, communication resources, or other requirements.

54 Claims, 8 Drawing Sheets

OTHER PUBLICATIONS

*IEEE International Conference on Communications,* vol. 2, May 1–5, 1994, pp. 908–912, XP002902251, New Orleans, LA, USA, ICC'94, SUPERCOMM/ICC'94, Conference Record "Serving Humanity through Communications," Lee et al., "A study on the performance analysis of error control algorithms in digital cellular DS/CDMA systems".

Douglas E. Comer, *Internetworking with TCP/IP,* vol. 1, Principles, Protocols, and Architecture, pp. 171–202.

TSG–RAN meeting #7, Madrid, Spain, Mar. 13–15, 2000, RP–000126, "Details of high speed downlink packet access", 5pgs.

CDMA/HDR: "A Bandwidth Efficient High Speed Wireless Data Service for Nomadic Users", Paul Bender et al., QUALCOMM, Incorporated, pp. 1–34.

*IEEE Transactions on Communications,* vol. COM–33, No. 5, May 1985, pp. 385–393, David Chase, "Code Combining—A Maximum–Likelihood Decoding Approach for Combining an Arbitrary Number of Noisy Packets".

* cited by examiner

FLEXIBLE ARQ FOR PACKET DATA TRANSMISSION

FIELD OF THE INVENTION

The present invention relates to data communications, and more particularly, to reliable data delivery in a communications system.

BACKGROUND AND SUMMARY OF THE INVENTION

In digital data communications systems, it is common for data packets transmitted over a communications channel to be corrupted by errors, e.g., when communicating in hostile environments. Wireless radio communications are often conducted in an especially hostile environment. The radio channel is subjected to a barrage of corrupting factors including noise, rapidly changing communications channel characteristics, multi-path fading, and time dispersion which may cause intersymbol interference, and interference from adjacent channel communications.

There are numerous techniques that may be employed by a receiver to detect such errors. One example of an error detection technique is the well-known Cyclic Redundancy Check (CRC). Other techniques use more advanced types of block codes or convolutional codes to accomplish both error detection and error correction. For both error detection and error correction, channel coding is applied which adds redundancy to the data. When information is received over a communications channel, the received data is decoded using the redundancy to detect if the data has been corrupted by errors. The more redundancy built into a unit of data, the more likely errors can be accurately detected, and in some instances, corrected.

Figure 1:
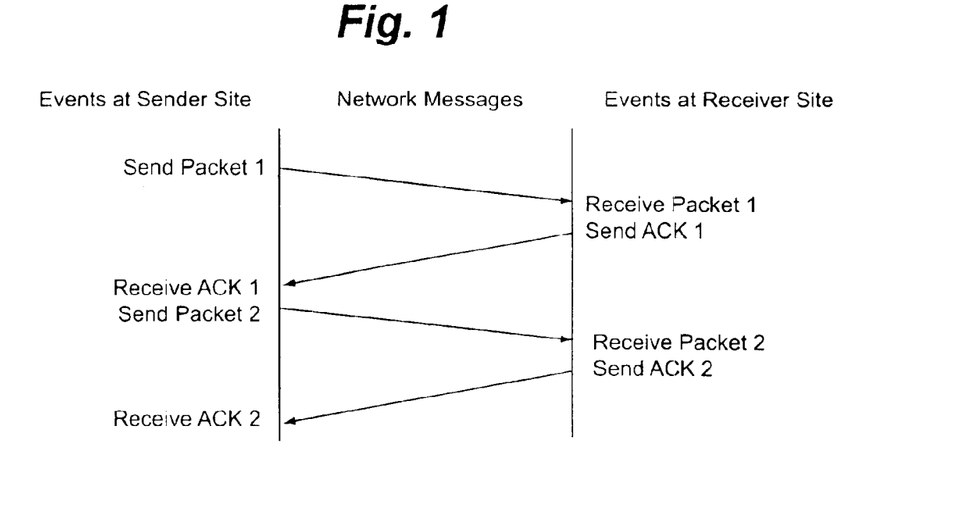
FIG. 1 is a signaling diagram illustrating an acknowledgement with retransmission data delivery protocol.

In many communication systems, including wireless communications, it is desirable to have a reliable data delivery service that guarantees delivery of data units sent from one machine to another without duplication of data or data loss. Most such reliable data delivery protocols use a fundamental retransmission technique where the receiver of the data responds to the sender of the data with acknowledgements and/or negative acknowledgements This technique is commonly known as Automatic Repeat reQuest (ARQ) transaction processing. Coded data packets are transmitted from a sender to a receiver over a communications channel. Using the error detection bits (the redundancy) included in the coded data packet, each received data packet is processed by the receiver to determine if tile data packet was received correctly or corrupted by errors. If the packet was correctly received, the receiver transmits an acknowledgement (ACK) signal back to the sender. In the most simple form of ARQ, sometimes called Stop-and-Wait (S&W) ARQ, the sender of the data stores each sent packet and waits for an acknowledgement of this packet before sending the next packet. When the ACK is received, the sender discards the stored packet and sends the next packet. An example of a Stop-and-Wait ARQ process is shown in FIG. 1. Vertical distance down the figure represents increasing time, and diagonal lines across the middle represent network data transmissions including acknowledgements.

Figure 2:
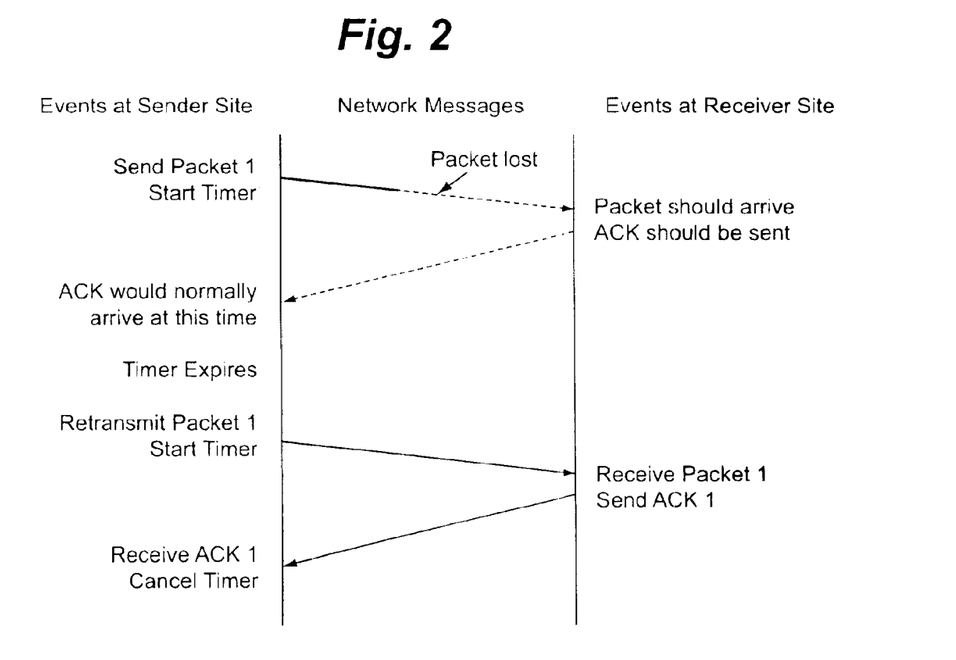
FIG. 2 is a diagram of the acknowledgement with retransmission data delivery protocol employed when a data packet is lost or corrupted.

FIG. 2 uses the same format as FIG. 1 to show what happens when a data packet is lost during transmission from sender to receiver. The sender starts a timer after transmitting the packet. If no acknowledgement is received when the timer expires, the sender assumes the packet was lost or corrupted, and retransmits it. The dotted lines show the time that would be taken by the transmission of a packet and its acknowledgement if the packet was not lost or corrupted. If the receiver detects errors in the packet, it may also send an explicit negative acknowledgement (NACK) to the sender. When the NACK is received, the sender can retransmit the packet without waiting for the timer to expire. In addition, if the ACK or NACK is lost on the link from the receiver to the sender, the timer will also expire, and the sender will retransmit the packet.

Figure 3A:
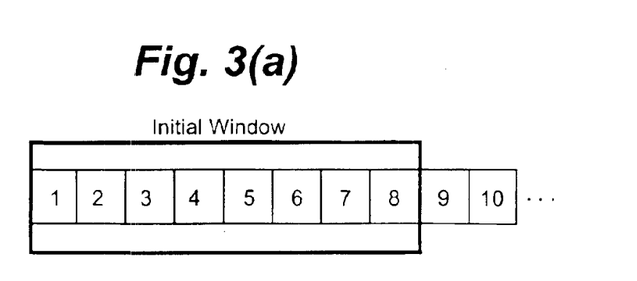
FIGS. 3(a) and 3(b) illustrate a sliding window technique.
Figure 3B:
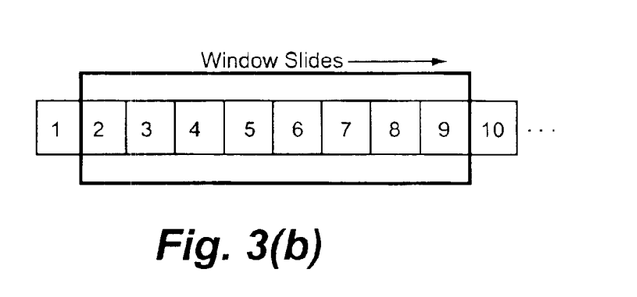

Stop-and-Wait ARQ decreases throughput because the sender must delay sending a new packet until it receives an acknowledgement for the previous packet. To avoid this problem, a sliding window form of acknowledgement and retransmission may be employed. With a predetermined window of size W, the sender may transmit up to W consecutive packets before an acknowledgement is received. If the sender does not receive an ACK signal for a specific packet within a predetermined time window, or if the sender receives a NACK signal for a specific packet, the sender retransmits either this data packet (selective repeat ARQ) or this packet and all subsequently transmitted packets (goback-N ARQ). In the example shown in FIGS. 3(*a*) and 3(*b*), the window is eight packets in length, and it slides so that packet nine (9) can be sent when an acknowledgement is received for packet one (1).

Figure 4:
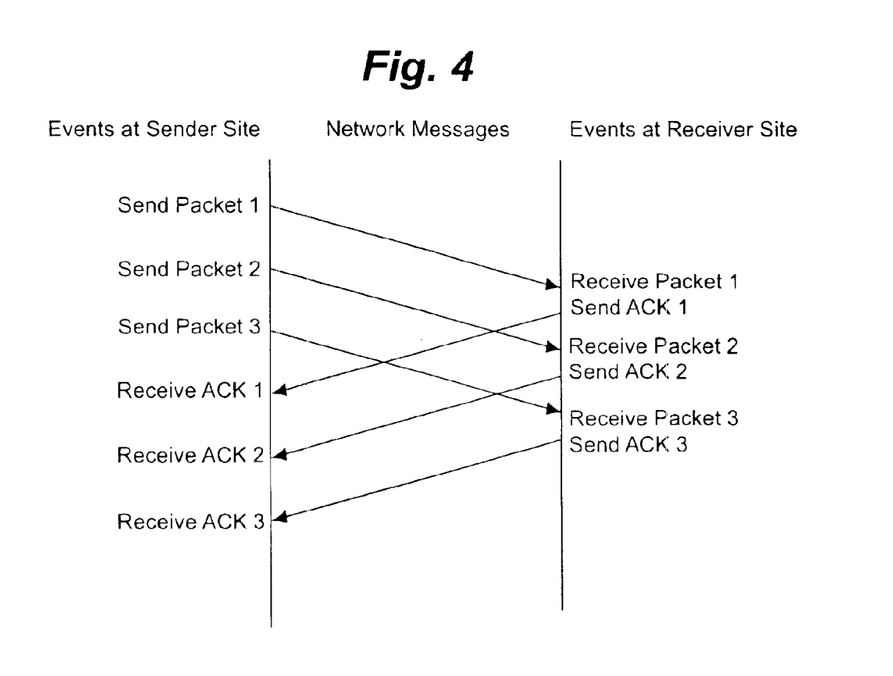
FIG. 4 shows an example of a sliding window ARQ protocol.

Because the sliding window ARQ protocol offers the possibility to keep the network saturated with packets, it can achieve substantially higher throughput than a simple Stop-and-Wait protocol. Another example of three packets transmitted using a sliding window ARQ protocol is shown in FIG. 4. The main point illustrated is that the sender can transmit all packets in the window without waiting for an acknowledgement.

Sequence numbers may be assigned to each transmitted data packet.

Sequence numbers are used in the ARQ protocol to identify lost packets and to identify the reception of multiple copies of the same packet. The receiver typically includes the sequence numbers in the acknowledgements, so that acknowledgements can be correctly associated with the corresponding buffered packets. Unfortunately, adding and processing sequence numbers complicates the ARQ protocol implementation.

Figure 5:
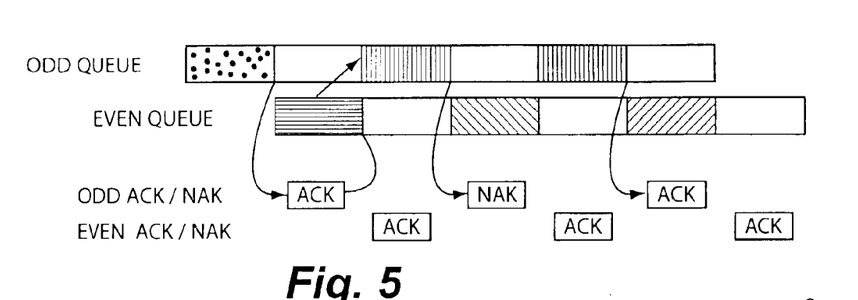
FIG. 5 is a diagram illustrating a dual queue, stop-and-wait ARQ implementation.

One simple way of implementing a retransmission scheme is disclosed by David Chase in an article entitled "Code Combining —A Maximum-Likelihood Decoding Approach for Combining an Arbitrary Number of Noisy Packets," *IEEE Transactions on Communications,* May 1985, pages 385–391. In this scheme, two Stop-and-Wait ARQ schemes run in parallel and access the channel in alternating time slots as shown in FIG. 5. Each queue keeps track of only one outstanding packet. The odd queue transmits one packet and waits for a positive acknowledgement before moving on to the next packet in the queue. While the receiver processes the received packet from the odd queue, the even queue transmits a packet to the receiver, and so on. The use of these two parallel queues eliminates the significant drawback of the single-queue, Stop-and-Wait ARQ— low throughput—while keeping the simplicity of the Stop-and-Wait protocol.

For the dual queue Stop-and-Wait ARQ protocol to operate properly, however, the receiver must be able to decode and acknowledge a received packet during the time slot during which the other queue is transmitting a packet. It may be difficult to complete this decoding and acknowledgement within the available time when data is transmitted at high speed. For example, high speed data transmitted in a downlink direction from a radio network to a wireless user equipment terminal in cellular radio communications systems may be problematic if the user equipment has only limited processing capabilities to perform the necessary decoding. Time slots may be fairly short, e.g., for scheduling reasons, on the order of just a few milliseconds. During this relatively to short time, the receiver must decode and process a data packet, which in the case of high data rates, may contain several thousands of bits. If the receiver does not completely process such a data packet and transmit an acknowledgement within this short time frame, the transmitter schedules a retransmission of that entire data packet, even if the packet could be correctly decoded. Such unnecessary retransmission of data packets seriously degrades throughput because the radio channel is occupied with retransmission of already correctly decoded data packets.

One possibility to increase the amount of time available for decoding and processing data packets at the receiver is to employ more than two parallel queues, i.e., to allow more than two outstanding packets at the same time. However, using parallel queues increases buffering requirements at both the transmitter and the receiver because each outstanding packet requires its own buffer. Buffering requirements are even more of a concern if "soft" information needs to be buffered at the receiver, as is the case if so-called incremental redundancy is used for the retransmissions. In case of incremental redundancy, the receiver combines multiple retransmissions of the same packet (i.e., combining of "soft" information") before decoding. The use of soft information requires substantially more memory as compared to "hard" information. Moreover, having multiple queues does not reduce the overall data processing speed requirements (millions of instructions per second (MIPS)) in the receiver, even though parallel processing can be advantageous.

Accordingly, it is an object of the present invention to provide a flexible ARQ scheme that permits trading off a desired performance with one or more communication resources required to achieve the desired performance. For example, such a scheme should be able to provide in one instance, higher performance in terms of higher data throughput at a higher resource cost, while in another instance also provide lower performance at a significantly reduced resource cost. The present invention provides such a flexible ARQ scheme.

A communications channel is set up between a transmitter and a receiver. A value is selected for a first parameter of a reliable data packet delivery procedure (RDPDP) for data packets transmitted over the communications channel. The first RDPDP parameter value is selected in accordance with a trade-off between a desired performance or goal, e.g., a specific throughput of data packets transmitted over the communications channel, and one or more resources required to support the desired performance or goal. An example of the first RDPDP parameter is a number of outstanding data packets that must be acknowledged by the receiver before more packets can be sent to the receiver. Another RDPDP parameter example is delay. Such a delay could be an acknowledgement delay denoting a time period between the transmission of a data packet and its acknowledgement. Alternatively, the delay could be a retransmission delay denoting the time period between a transmission and a retransmission (in case of no acknowledgement).

In a preferred, non-limiting example embodiment, first and second parameter values are selected for the desired trade-off Accordingly, a specific number of outstanding data packets and a retransmission delay can be selected to achieve a desired performance, e.g., a desired throughput of data packets, at a particular resource cost.

The value(s) of the first and/or second RDPDP parameters may be determined so that a communication resource is efficiently used in supporting the data packet acknowledgement procedure. Such a communication resource might include one or more of the following: a data processing speed requirement to support the acknowledgement of sent data packets, a buffering requirement to support the acknowledgement of sent data packets, and a power requirement to support the acknowledgement of sent data packets. The value(s) of the first parameter (and the second parameter) may be determined when the packet data communication is established or after the packet data communication is established. Indeed, a parameter value may be modified if some aspect of the packet data communication changes from when the packet data communication was originally established, e.g., a change in service, a change in the configuration or condition of the receiver and/or transmitter. etc.

A smaller number of outstanding packets may be selected, along with a larger delay, in order to reduce buffering requirements and required data processing speed in the receiver. A larger number of outstanding packets may be selected along with a smaller delay to increase the throughput for the packet data communication. A larger number of outstanding packets may be selected along with a larger delay to obtain a higher throughput with a long processing time, but at the cost of larger memory buffers and a higher delay. Because of the flexibility provided by the present invention, a communications device may set its own performance objectives for a particular connection based upon one or more performance requirements or communication resources.

BRIEF DESCRIPTION OF THE DRAWINGS

The foregoing and other object, features, and advantages of the present invention may be more readily understood with reference to the following detailed description taken in conjunction with the accompanying drawings, wherein like reference numerals designate like structural elements, and in which.

DETAILED DESCRIPTION OF THE DRAWINGS

In the following description, for purposes of explanation and not limitation, specific details are set forth, such as particular embodiments, procedures, techniques, etc., in order to provide a thorough understanding of the present invention. However, it will be apparent to one skilled in the art that the present invention may be practiced in other embodiments that depart from these specific details. For example, the present invention may be implemented in any data communications system between any data sender and data receiver that employs an ARQ communications protocol. Although a specific example is provided below that employs two ARQ parameters, the invention is not limited to these two specific ARQ parameters. Indeed, other ARQ parameters may be used. Nor is the invention limited to a particular number of ARQ parameters. The invention may be implemented using just one ARQ parameter or more than two ARQ parameters.

In some instances, detailed descriptions of well-known methods, interfaces, devices and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an Application Specific Integrated Circuit (ASIC), and/or using one or more Digital Signal Processors (DSPs).

Figure 6:
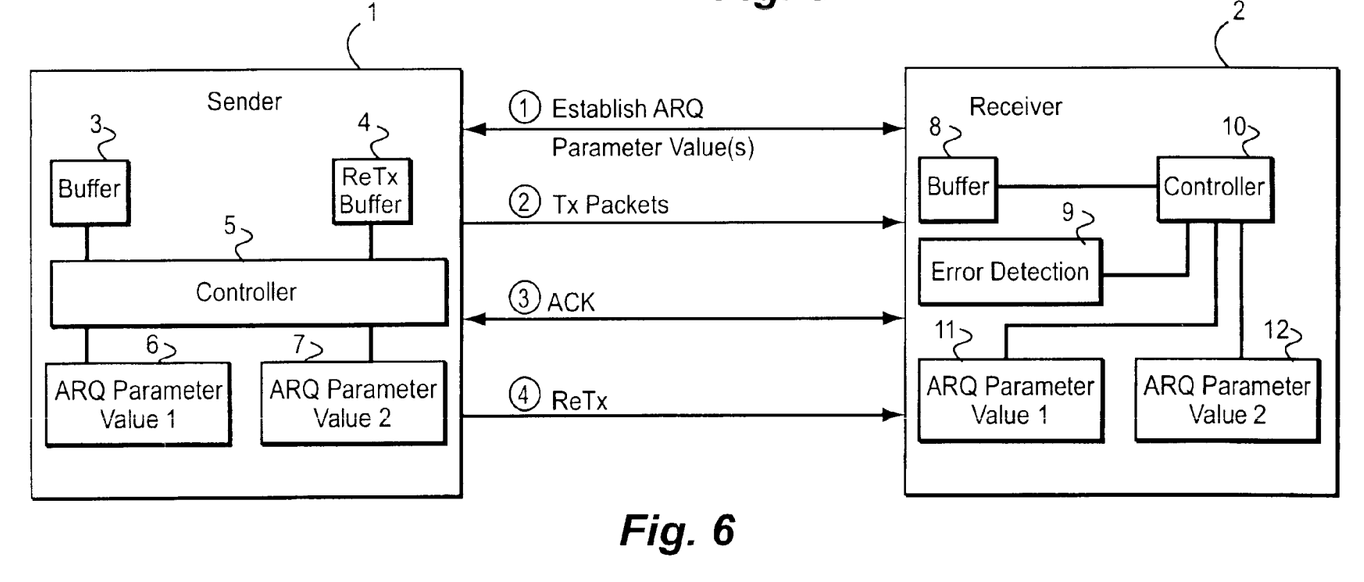
FIG. 6 is a function block diagram showing a sender and a receiver of a user equipment terminal that may be used to implement a flexible ARQ procedure in accordance with a general example embodiment of the present invention.

The present invention may be employed in any communications system where data packets are passed between two or more nodes. FIG. 6 shows two nodes including a sender 1 and a receiver 2 which communicate data over a communications channel using a flexible Automatic Repeat Request (ARQ) protocol in accordance with a general example embodiment of the present invention. Of course, the general embodiment may be employed with any reliable packet data delivery procedure (RDPDP). The sender 1 includes a buffer 3 for storing packet data to be sent over the communications channel and a retransmission buffer 4 for storing outstanding packets awaiting positive acknowledgement from the receiver. The retransmit buffer 4 must be configured so that it can store the maximum number of outstanding packets awaiting acknowledgement from the receiver before further packets stored in buffer 3 may be transmitted over the communications channel to receiver 2. A controller 5 coupled to the buffer 3 and the retransmission buffer 4 controls transmission and retransmissions, as well as performs other data processing tasks.

One or more ARQ parameters may be used in implementing the invention. In this non-limiting example, two ARQ parameters are employed. Also coupled to controller 5 are blocks 6 and 7 storing the values for ARQ parameter 1 and ARQ parameter 2, respectively. The values of the ARQ parameters may be selected when the communications channel between the sender 1 and the receiver 2 is established, some time after the communication is established, or they may be changed during the communication. The values of the ARQ parameters may be determined to achieve a particular performance, to use a particular communication resource efficiently or sparingly, or to meet some other desired goal.

The receiver 2 includes a buffer 8 for storing received packets from the sender 1 over the communications channel and an error detection block 9 for performing error detection processing on received packets stored in the buffer 8. The buffer 8 and error detection 9 are coupled to a controller 10 which performs a number of data processing and control tasks, including detecting from the error detection block 9 packets which have been received in error or have not been received within a predetermined time interval. The controller 10 is also coupled to one or more ARQ parameter value blocks 11 and 12 which store the values of ARQ parameters that are established for the communication between the sender 1 and the receiver 2. These values correspond to the values stored in blocks 6 and 7 in the sender 1.

FIG. 6 also shows four numbered operations. First, when the communications channel is being established between the sender I and receiver 2, the sender 1 and receiver 2 preferably establish one or more ARQ parameter values. In the block diagram of FIG. 6, two ARQ parameter values (for example) are established and stored in blocks 6 and 7 for the sender 1 and in blocks 11 and 12 for the receiver 2. These ARQ parameter values determine how one or more communication resources that would be used in supporting the ARQ procedure will be employed. These parameter values may also determine the performance of the ARQ procedure, e.g., what particular data throughput will be achieved. In the second step, data packets stored in the buffer 3 are transmitted over the data communications channel to the receiver 2 and stored in the buffer 8 taking into account the effect of the value of ARQ parameters 1 and/or 2 (if any).

The transmitted packets are also stored in the retransmission buffer 4 in the sender 1 until acknowledged. In the third step, the error detection block 9 indicates erroneously received or missing packets to the controller 10 which then sends an acknowledgement signal to the sender for properly received packets taking into account impact of the value of ARQ parameters 1 and/or 2 (if any). Optionally, a negative acknowledgement for packets not properly received may be sent by the receiver 2. Fourth, for those packets not properly acknowledged, the sender 1 retransmits packets stored in the retransmission buffer taking into account the effect of the value of ARQ parameters 1 and/or 2 (if any).

Figure 7:
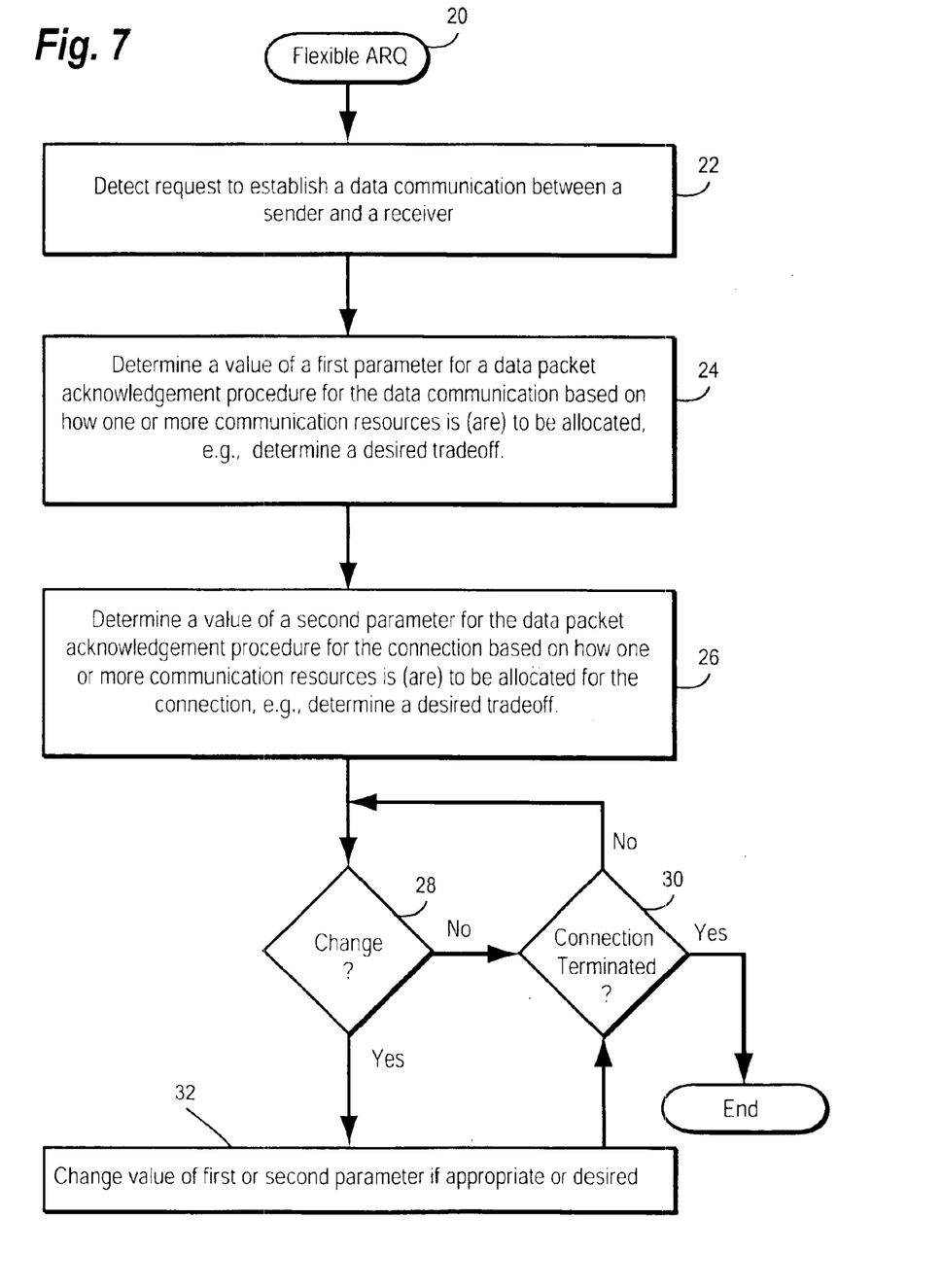
FIG. 7 is a flowchart illustrating a flexible ARQ procedure in accordance with the general example embodiment of the present invention.

Reference is now made to the flexible ARQ scheme (block 20) shown in diagram format in FIG. 7. Initially, a request is detected to establish a data communication between a sender and a receiver (block 22). A value of a first parameter for a data packet acknowledgement procedure is determined for the data communication based on how one or more communication resources is(are) to be allocated (block 24). For example, the value may be selected to achieve a desired trade-off between performance and required communication resources to support a particular performance. Similar procedures are performed to determine a value of a second parameter for the data packet acknowledgement procedure (block 26). Of course, the present invention is not limited to a particular number of parameters. Indeed, the invention may be implemented with only a single parameter or with two or more parameters.

A decision is made (block 28) if there has been a change that would affect the value of the first or second parameters initially determined. Examples include a service requested by the sender or receiver changes, a performance demand change, etc. If there is no change, a decision is made whether the connection between the sender and receiver has been terminated (block 30). If not, further change monitoring at block 28 continues; otherwise, the routine ends. If there has been a change, e.g., a change in services (such as the sender or receiver desires more or less bandwidth), the value of the first and/or second parameters may be changed if appropriate or otherwise desired (block 32). After the change of parameter value is implemented, control returns to block 30.

Figure 8:
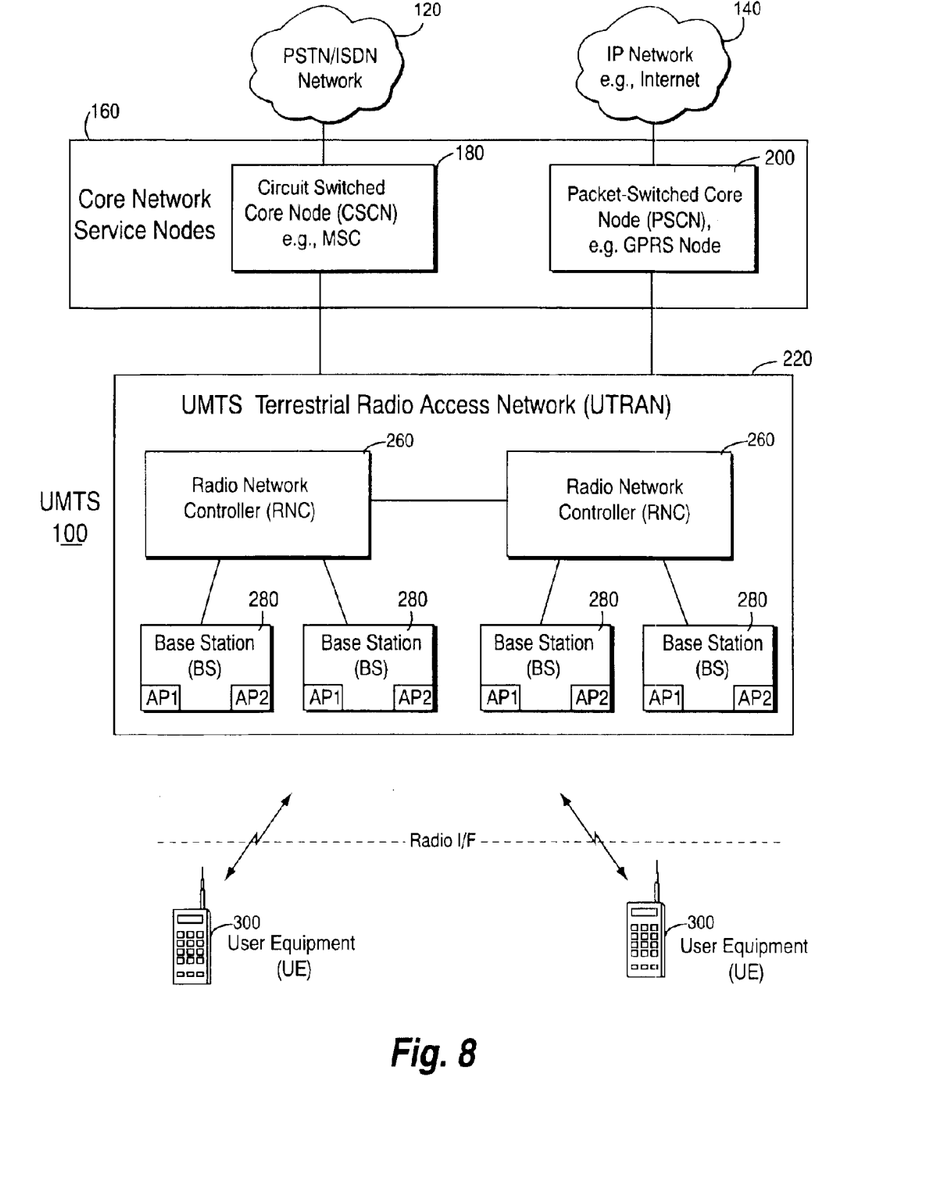
FIG. 8 is a diagram illustrating a wideband CDMA system in which a specific application of the present invention may be employed over a radio communications interface.

The present invention finds particular (although not limiting) application to a Universal Mobile Telecommunications System (UMTS) such as that shown at reference numeral 100 in FIG. 8. A representative, circuit-switched core network, shown as cloud 120, may be for example the Public Switched Telephone Network (PSTN) or the Integrated Services Digital Network (ISDN). A representative, packet-switched core network, shown as cloud 140, may be for example an IP network like the Internet. Both core networks are coupled to corresponding core network service nodes 160. The PSTN/ISDN circuit-switched network 120 is connected to a circuit-switched service node shown as a Mobile Switching Center (MSC) 180 that provides circuit-switched services. The packet-switched network 140 is connected to a General Packet Radio Service (GPRS) node 200 tailored to provide packet-switched type services.

Each of the core network service nodes 180 and 200 connects to a UMTS Terrestrial Radio Access Network (UTRAN) 240 that includes one or more Radio Network Controllers (RNCs) 260. Each (RNC is connected to a plurality of Base Stations (BSs) 280 and to other RNCs in the UTRAN 220. Each base station 280 corresponds to one access point (one sector or cell) or includes plural access points. Radio communications between one or more base station access points and a Mobile Terminal (MT) 300 (one type of wireless UE) are by way of a radio interface. A mobile terminal is an example of a wireless user equipment. Radio access in this non-limiting example is based on Wideband-CDMA (W-CDMA) with individual radio channels distinguished using spreading codes. Wideband-CDMA provides wide radio bandwidth for multi-media services including packet data applications that have high data rate/bandwidth requirements. One scenario in which high speed data may need to be transmitted downlink from the UTRAN over the radio interface to a mobile terminal is when the mobile terminal requests information from a computer attached to the Internet, e.g., a website.

Figure 9:
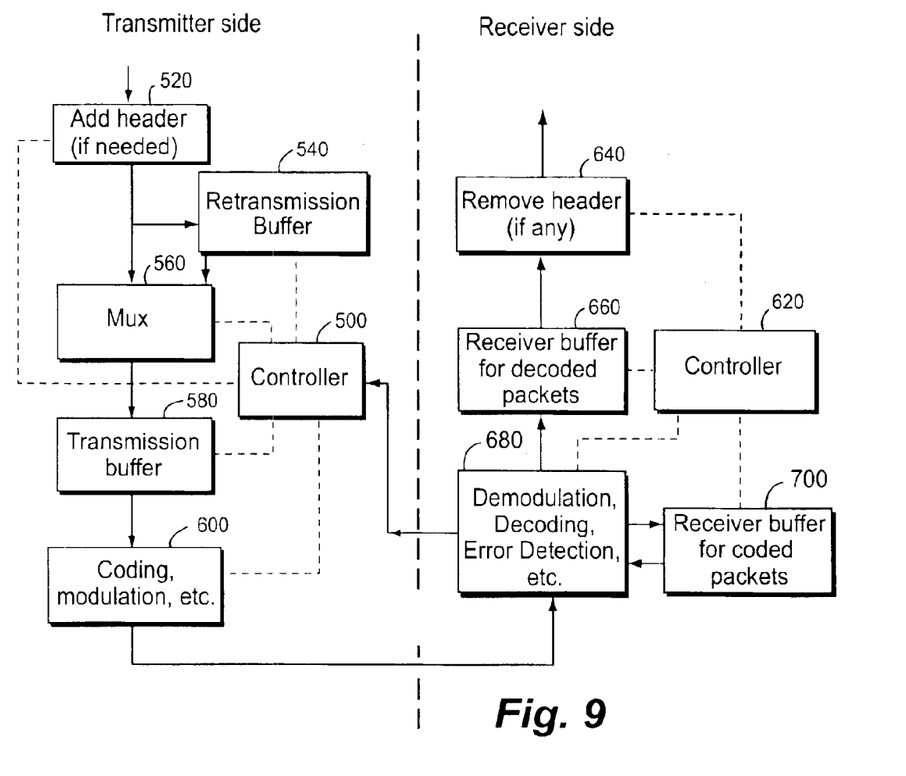
FIG. 9 is a function block diagram showing a radio transmitter and radio receiver that may be used to implement the flexible ARQ procedure according to the present invention.

FIG. 9 shows modules, e.g., software modules, that may be used to implement the flexible ARQ protocol in an example downlink data transmission scenario in the UMTS system of FIG. 8 from the BS to the UE. The base station in this example has the transmitter or sender side function modules, while the receiver side corresponds to the user equipment. Similar function modules may be used in an uplink scenario in a user equipment transmitter and in receivers of the base station.

The transmitter side receives data packets or blocks to be transmitted to the UE receiver from a higher protocol layer. A packet header may be added (block 520) to include error detection bits in the packet. The data packet from block 520 is stored in a retransmission buffer 540 and also provided to a multiplexer 560. The retransmission buffer 540 stores the packet until it is acknowledged. The output of multiplexer 560, selected by a controller module 500, is provided to a transmission buffer 580. The transmission buffer 580 stores data packets to be transmitted to the receiver until the transmitter is ready to transmit those packets over the communications channel. Packets output from the transmission buffer 580 are processed in a signal processing module 600. Module 600 performs various operations, such as other coding (in addition to any ARQ related coding), modulation, etc., before the coded packets are transmitted to the receiver.

If the transmitter/sender is in the RNC, coding, modulation, etc. are not performed in the RNC but rather in the base station access point via which the RNC communicates with the UE. In the access point transmitter, coded packets (rather than the uncoded packets) may be stored in a retransmission buffer 540 if desired. Blocks 520–600 are coordinated by the controller 500 which also stores and uses the value(s) of one or more ARQ parameters for the communication.

On the receiver side, data packets or blocks are initially detected in a signal processing block 680 which performs demodulation, decoding, error detection, etc. functions. Signal processing block 680 detects erroneous packets, e.g., using.CRC bits. Either an acknowledgement message (ACK) or a negative acknowledgement message (NACK), (or some other form of a request to retransmit message), is sent back for each packet to the controller 500 on the transmitter side. If the transmitter controller 500 receives a data packet acknowledgement, that packet is removed from the retransmission buffer 540. If the transmitter controller 500 receives a negative acknowledgement or if a the delay time t expires, the controller 500 selects the particular data packet from the retransmission buffer 540 and routes it via the multiplexer 560 for retransmission to the receiver. This retransmission procedure may repeat until an acknowledgement is received. Alternatively, there may be a limit to the number of retransmissions.

Returning to the receiver side, the signal processing block 680 may optionally store in a receiver buffer 700 those coded packets detected as erroneous. An incorrect packet stored in the buffer 700 may then be "soft combined" with a retransmitted version of the same packet. Such combining or other reconstruction of a packet increases the probability that it will be correctly decoded after retransmission. This procedure is sometimes referred to as Incremental Redundancy (IR) or Hybrid ARQ, and it may be used to make the ARQ scheme more robust.

The decoded, accurately received packets are stored in a receiver buffer 660 and used to ensure that the packets are delivered in the right order, i.e., the order in which they were transmitted. If packets are incorrectly received or not received at all and retransmissions are requested, subsequent packets may arrive before the reception of a correct version of a retransmitted packet. The receiver buffer 660 stores the subsequent packets so that the packets in the sequence can be delivered in the right order. Block 640 removes any header added to the packets, and the packets are delivered to the next protocol layer. Blocks 640–700 are controlled by a receiver controller 620 which also stores and uses the value(s) of one or more ARQ parameters for the communication.

Figure 10:
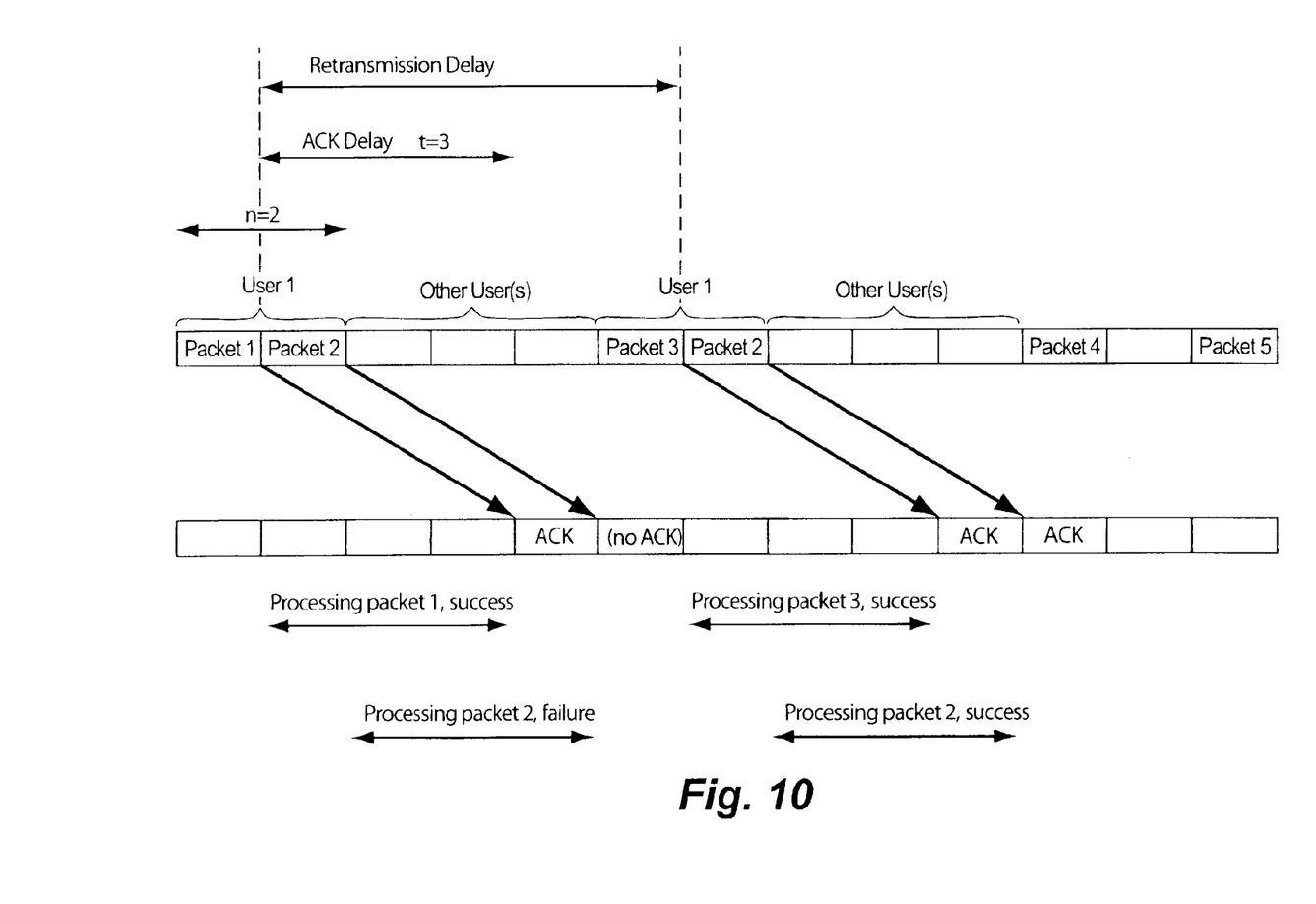
FIG. 10 is a diagram illustrating a two ARQ parameter example embodiment.

The communication established between the UTRAN and a user equipment terminal 300 in FIG. 8 is set up over the radio interface using a communications channel established by way of the base station 280. In this preferred but non-limiting embodiment, two ARQ parameters are employed, including a maximum number of outstanding packets, n, and a delay parameter, t. The delay parameter may be an acknowledgement delay, which is the delay time between when a packet is sent and when it is acknowledged as shown in FIG. 10. Alternatively, the delay parameter may be a retransmission delay, which is the delay time between sending a packet and retransmitting it if that packet is not acknowledged positively. If the retransmission delay is used, the acknowledgement delay may be readily obtained therefrom, e.g., acknowledgement delay retransmission delay−x time slot(s).

Retransmission delay may be more optimal because the larger the cell radius, the longer the propagation delay from the transmission of an acknowledgement from the receiver to the reception of the acknowledgement at the transmitter. As a result, there is less time for the transmitter to prepare a retransmission. If retransmission delay is specified, the transmitter can set this parameter depending on the cell radius for example.

A macrocell would have a larger cell radius than a microcell. However, there needs to be an agreement between transmitter and receiver when to expect an acknowledgement; otherwise, confusion may arise as to which packet an acknowledgement belongs.

Two delay parameters, t1 and t2, may also be employed. In this case, t1 could specify when the receiver must transmit an acknowledgement, and t2 could specify when the transmitter should retransmit the packet (if necessary). For example, if t1=5 and t2=7, a packet transmitted in time slot x will be acknowledged in slot x+t1=x+5 and retransmitted (if necessary) in slot x+t2=x+7. Both delay parameters could be negotiated. Or, as mentioned above, one delay parameter could be derived from the other according to some predetermined formula (e.g., t1=t2−2).

The two ARQ parameters n and t in the non-limiting example shown in FIG. 10 have values of n=2 and t=3, where t in this example is an acknowledgement delay. Two packets are transmitted corresponding to packet 1 and packet 2 in accordance with n=2. Although User 1 is shown initially transmitting two consecutive packets, the two packets could also be transmit non-consecutively as illustrated for packets 4 and 5. No additional packets are transmitted until an acknowledgement is received for packet 1. The reception, decoding, processing, and acknowledgement operations from the receiver (user equipment) to the transmitter (the base station) take three time intervals.

During the fifth timeslot, packet 1 is properly acknowledged, so the next packet to be transmitted by the base station to the user equipment terminal corresponding to packet 3 is transmitted. Since an acknowledgement is not received three time intervals after the transmission of packet 2, the base station retransmits packet 2 during time interval seven. After receiving the acknowledgement for packet 3 within three subsequent timeslots, i.e., t=3, a packet 4 is transmitted. When a proper acknowledgement is received in three time slots after the retransmission of packet 2, a next packet 5 is transmitted.

A significant advantage of the present invention is that the value of "n" and/or "t" may be initially selected and changed depending upon the objective(s) and/or condition(s) for the communication. Note that the traditional, single queue, Stop-and-Wait ARQ scheme corresponds to an "n" of 1 and a "t" of any number. The dual queue, Stop-and-Wait scheme may be obtained with an "n" of 2 and a "t" of 1. In a multi-user system, the unused time slots may be used for transmitting data to other users and, therefore, need not be wasted, unless there is only one active user in the system. While in FIG. 10, the retransmission of packets is performed immediately after the time when the acknowledgement should have been received, the retransmission may also be scheduled at a later time slot, for example, if the base station transmitter is busy transmitting data to some other user.

Figure 11:
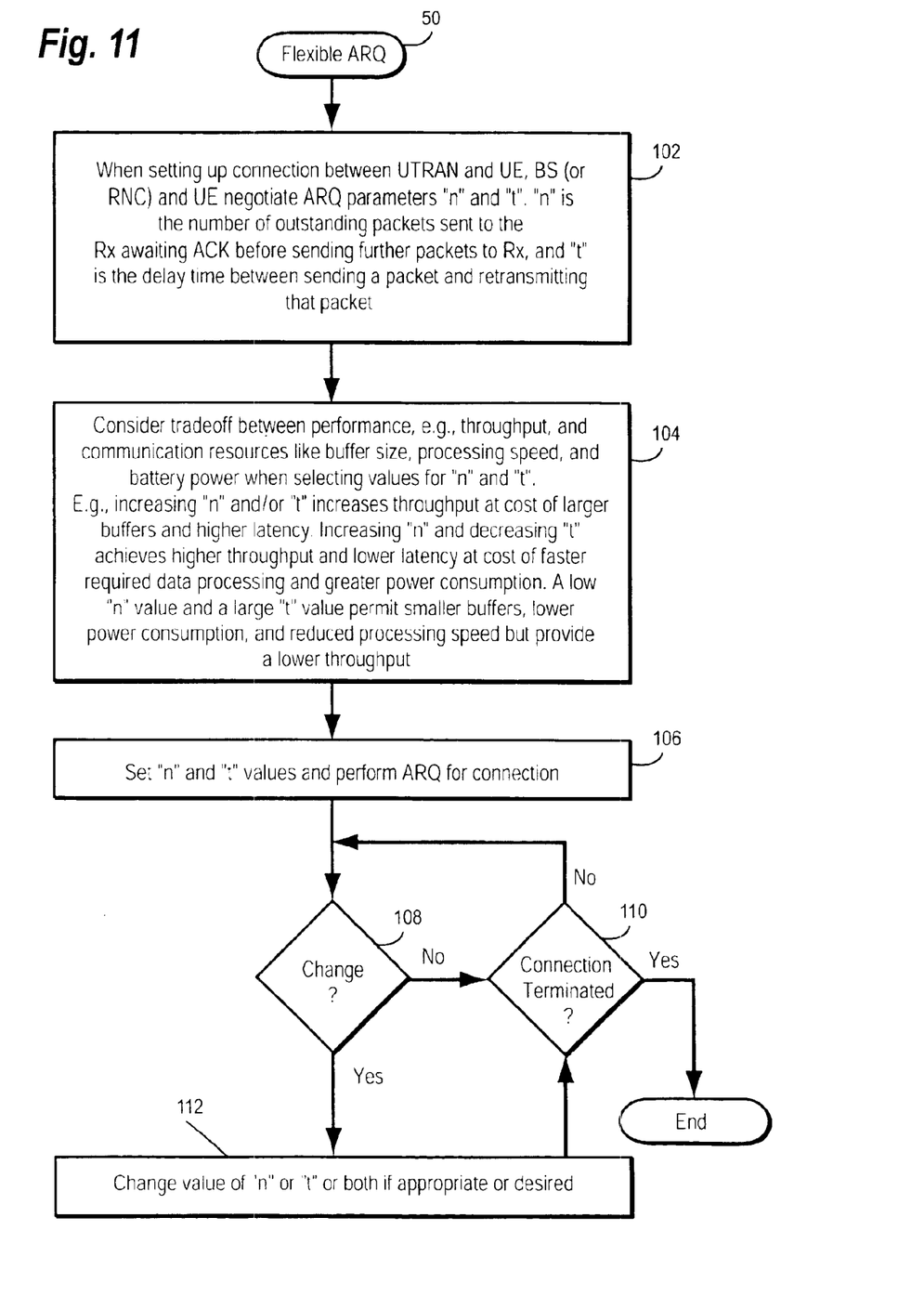
FIG. 11 is a flowchart illustrating a flexible ARQ procedure in accordance with a two ARQ parameter example embodiment of the present invention.

FIG. 11 illustrates a flexible ARQ scheme (block 100) in flowchart format corresponding to the non-limiting, example implementation of the present invention where the two ARQ parameters n and t are employed. When setting up a connection between the UTRAN and the user equipment terminal via a base station, the user equipment and the base station (or the RNC) negotiate values for the ARQ parameters n and t (block 102). As described above, n is the number of outstanding packets sent to the UE receiver awaiting proper acknowledgement at the base station before the base station transmitter sends further packets to the UE receiver. The ARQ parameter t is the delay time between sending a packet from the base station transmitter and the receipt of an acknowledgement at the base station transmitter for that packet or its retransmission. The negotiation of ARQ parameter values may be based on a trade-off between a desired performance objective, such as data throughput across the radio channel, and one or more communication resources such as buffering, data processing speed, and power requirements or channel conditions such as interference. The value of these parameters may also be selected to ensure efficient use of a particular communications resource such as buffer space, processor speed, and/or battery power (block 104).

For example, increasing the value of n and t (where $n \leq t$) increases the throughput at the cost of larger buffers and higher delay. Delay is measured from the time of transmission of a packet until it is decoded in the receiver. The larger the value of t, the longer it takes until the packet is determined to be correctly received. Increasing the value of n and decreasing the value of t achieves a higher throughput and a lower delay at a cost of faster required data processing and greater battery power consumption for the UE. A low n value and a large t value permit smaller buffers, lower power consumption, and reduced processing speed, but at the cost of a lower throughput.

The determined values for ti and t are set, and the ARQ procedures are performed for the connection using those values (block 106). A determination is made in decision block 108 whether there is a need or a desire to change one or both of these values. If not, a decision is made whether the connection between the base station and the user equipment terminal is terminated (block 110). If so, the routine ends; if not, the connection is monitored for any change at block 108. If there is a change, e.g., in desired service or in a condition of the communication, the value of n or t may be changed either separately or together if appropriate or otherwise desired (block 112). A decision is then made if the connection is terminated at block 110 with control proceeding as indicated.

The present invention has a number of advantages. First, the flexible ARQ scheme is simple. No block numbers need be included in the acknowledge message because it is implicitly clear which packet is acknowledged once the values of n and t are established. This simplicity is particularly advantageous in the uplink direction where excessive transmissions should be avoided in order to reduce interference and improve battery life of the user equipment terminal.

Second, the stalling of the buffer queue resulting from a single queue Stop-and-Wait protocol is avoided by permitting an n value to be greater than 1. A stalled queue cannot move onto the next packet until the previous one has been acknowledged. As the name Stop-and-Wait suggests, the queue stops and waits for an acknowledgement before moving on to the next packet.

Third, the receiver can trade off or balance performance, such as data throughput, with one or more communication resources, such as buffering requirements, processing speed, battery consumption, etc. For a receiver with a strict battery power budget, for example, a small buffer size and a long processing time may be established with n=1 and t=large, with the consequence of a lower throughput. A high-end receiver with a small memory may set n=2 and t=1 to obtain a high throughput and low latency, but at the higher cost associated with faster processing. Alternatively, a high-end user equipment terminal can set t=large and n=large to obtain a high throughput with a long processing time, but at the cost of larger memory buffers and a higher latency. In order to allow for the acknowledgement message to reach the transmitter, a larger value of t might be necessary when communicating over large distances, e.g., in a macrocell, as compared to smaller distances, e.g., in a microcell.

Consider a situation where less than n packets are outstanding, for example, only packet 1 is transmitted but not packet 2 as shown in FIG. 10, and the receiver has negotiated larger values for n and t. The receiver can save battery power by only using a smaller amount of processing resources including demodulation, decoding of the error correcting code, checking the CRC, etc. Typically, decoding the error correcting code is the most "costly" operation in terms of time and battery power. This benefit is not achieved if the receiver negotiates small values for n and t.

Although more significant advantages may be obtained in the mobile terminal receiver in the downlink scenario described, the base station transmitter may also perform a similar tradeoff operation. However, the transmitter is typically occupied most if not all the time since there are other users to service. However, depending on the exact implementation of the transmitter, there might be advantages with one set of ARQ parameters compared to another.

Fourth, it is possible to change or renegotiate the ARQ parameters for a particular communication. For example, ARQ parameter values may be switched between a power saving, low throughput mode and a more expensive, fast mode as user requirements. One example occasion when it might be particularly desirable to change parameters is when the mobile terminal is using two or more services at the same time. Assume only a packet data transfer service is initially used with the flexible acknowledgement scheme described above. Later, an additional service that is not a packet-based service, e.g., circuit-switched video, is requested. To support this new service, additional resources are required, e.g., a turbo-decoder. Consequently, there is a decrease in the number of turbo-decoders (and maybe other resources) for the packet data service. The parameters for the flexible acknowledgement scheme may therefore need to be renegotiated to allow for more processing time or a fewer number of outstanding packets to cope with the decrease of available turbo-decoders (and possibly other resources).

Another example when an ARQ parameter adjustment may be desirable is the situation where additional bandwidth becomes available. For example, the network reconfigures the servicing cell or the user is switched to another cell where more of the cell capacity is set aside for packet data support. If the cell sets aside more capacity for packet data, the mobile terminal may want to renegotiate the ARQ parameters to allow for more outstanding packets and thereby take advantage of the additional data capacity provided by the cell. If the packet data bandwidth provided by a servicing cell decreases, the mobile terminal may re-negotiate the ARQ parameters. The re-negotiation may free up some resources or permit a slower processing speed in order to save mobile terminal battery power as there is no need to support high rate data because the cell currently is not offering that service to its full extent. Of course, other situations may arise that favor renegotiation of ARQ parameters.

While the present invention has been described with respect to particular example embodiments, those skilled in the art will recognize that the present invention is not limited to those specific embodiments described and illustrated herein. Different formats, embodiments, adaptations besides those shown and described, as well as many modifications, variations and equivalent arrangements may also be used to implement the invention. Therefore, while the present invention is described in relation to preferred example embodiments, it is to be understood that this disclosure is only illustrative and exemplary of the present invention. Accordingly, it is intended that the invention be limited only by the scope of the claims appended hereto.

What is claimed is:

1. A method for acknowledged packet data communications between a sender and a receiver, comprising:
   detecting a request to establish a packet data communication between the transmitter and the receiver where sent data packets are acknowledged when received by the receiver,
   determining a value of a first parameter for a packet data acknowledgment procedure for the packet data communication so that a communication resource is efficiently used in supporting the packet acknowledgment procedure, and
   determining a value for a second parameter for the packet data acknowledgment procedure so that the communication resource is efficiently used in the packet data acknowledgement procedure.

2. The method in claim 1, wherein the communication resource includes a data processing speed requirement to support the acknowledgment of sent data packets.

3. The method in claim 1, wherein the communication resource includes a buffering requirement to support the acknowledgment of sent data packets.

4. The method in claim 1, wherein the value of the first parameter is determined when the packet data communication is established.

5. The method in claim 1, wherein the value of the first parameter is determined to achieve a desired, throughput of packet data for the packet data communication.

6. The method in claim 1, wherein the first parameter value is a number of outstanding data packets transmitted to the receiver by the sender to be acknowledged by the receiver.

7. The method in claim 1, wherein the first parameter is a delay time associated with the packet acknowledgement procedure.

8. The method in claim 7, wherein the delay time is an acknowledgement delay denoting a time period between sending a data packet and acknowledgement of receipt of that data packet.

9. The method in claim 8, wherein the acknowledgment delay includes a time to transmit the data packet, process the data packet at the receiver, and receive an acknowledgement.

10. The method in claim 8, wherein the sender resends the data packet if the acknowledgement is not received within the acknowledgement delay.

11. The method in claim 7, wherein the delay time is a retransmission delay denoting a time period between sending a data packet and retransmission of that data packet if that data packet needs to be retransmitted.

12. The method in claim 11, wherein the acknowledgment delay includes a time to transmit the data packet, process the data packet at the receiver, and receive an acknowledgement.

13. The method in claim 11, wherein the sender resends the data packet if the packet to be retransmitted is not retransmitted within the retransmission delay.

14. The method in claim 7, further comprising:
storing in the transmitter n transmitted data packets, and
resending the n transmitted data packets if the acknowledgment is not received within the delay period.

15. The method in claim 7, further comprising:
selecting a smaller number of outstanding packets and a larger delay to reduce buffering requirements and required data processing speed in the receiver.

16. The method in claim 7, further comprising:
selecting a larger number of outstanding packets and a smaller delay to increase throughput for the packet data communication.

17. The method in claim 7, further comprising:
selecting a larger number of outstanding packets and a larger delay to increase throughput for the packet data communication.

18. The method in claim 7, further comprising:
selecting a larger delay when communicating over a larger distance as compared to communicating over a smaller distance.

19. The method in claim 18, wherein the larger distance corresponds to a macrocell and the smaller distance corresponds to a microcell.

20. The method in claim 1, further comprising:
changing only the first parameter or the second parameter while keeping the other parameter constant.

21. A method for acknowledged packet data communications between a sender and a receiver, comprising:
detecting a request to establish a packet data communication between the transmitter and the receiver where sent data packets are acknowledged when received by the receiver, and
determining a value of a first parameter for a packet data acknowledgment procedure for the packet data communication so that a communication resource is efficiently used in supporting the packet acknowledgment procedure,
wherein the communication resource includes a power requirement related to the acknowledgement of sent data packets.

22. A method for acknowledged packet data communications between a sender and a receiver, comprising:
detecting a request to establish a packet data communication between the transmitter and the receiver where sent data packets are acknowledged when received by the receiver, and
determining a value of a first parameter for a packet data acknowledgement procedure for the packet data communication so that a communication resource is efficiently used in supporting p the packet acknowledgment procedure,
wherein the value of the first parameter is determined after the packet data communication is established when some aspect of the packet data communication has changed from when the packet data communication was originally established.

23. A method for acknowledged packet data communications between a sender and a receiver, comprising:
detecting a request to establish a packet data communication between the transmitter and the receiver where sent data packets are acknowledged when received by the receiver,
determining a value of a first parameter for a packet data acknowledgement procedure for the packet data communication so that a communication resource is efficiently used in supporting the packet acknowledgment procedure, and
during the packet data communication, assigning a new value to one or both of the first and second parameters.

24. A method for reliable data communications between a transmitter and a receiver comprising:
setting up a communication channel between the transmitter and the receiver;
selecting a value of a first parameter of a reliable data packet delivery procedure (RDPDP) for data packets transmitted over the communication channel,
wherein the first parameter value is selected for a desired tradeoff between a performance associated with the communication and one or more RDPDP resources required to support the performance,
selecting a value of a second parameter of the RDPDP for data packets transmitted over the communication channel,
wherein the first and second parameter values are selected for the desired tradeoff.

25. The method in claim 24, wherein the first parameter is a number of outstanding data packets to be acknowledged by the receiver.

26. The method in claim 24, wherein the first parameter is a delay associated with the RDPDP.

27. The method in claim 24, wherein the first parameter is a number of outstanding data packets to be acknowledged by the receiver and the second parameter is a delay associated with the RDPDP.

28. The method in claim 24, wherein the one or more RDPDP resources includes an RDPDP buffering requirement.

29. The method in claim 24, wherein the one or more RDPDP resources includes an RDPDP data processing speed.

30. The method in claim 24, wherein the performance is a specific throughput of data packets transmitted over the communications channel.

31. A method for reliable data communications between a transmitter and a receiver comprising:
setting up a communication channel between the transmitter and the receiver;
selecting a value of a first parameter of a reliable data packet delivery procedure (RDPDP) for data packets transmitted over the communication channel,
wherein the first parameter value is selected for a desired tradeoff between a performance associated with the communication and one or more RDPDP resources required to support the performance, and
wherein the one or more RDPDP resources includes an RDPDP power requirement.

32. For use in a communications system where a packet communication is requested between a transmitter and a receiver, apparatus for use in the receiver, comprising:
a buffer for storing data packets received from the transmitter, and
a controller for processing received packets stored in the buffer and sending an acknowledgement signal for each received packet in accordance with a data packet acknowledgement procedure,
wherein for a particular communication with a transmitter, the controller is configured to determine a value of a first parameter affecting a performance of the data packet acknowledgement procedure, wherein the receiver is a wireless user equipment terminal and a characteristic of the performance is battery power consumption required for the controller to process and acknowledge received packets.

33. The apparatus in claim 32, wherein a characteristic of the performance is a buffering capacity required for the controller to process and acknowledge received packets.

34. The apparatus in claim 32, wherein a characteristic of the performance is a processing speed required for the controller to process and acknowledge received packets.

35. The apparatus in claim 32, wherein a characteristic of the performance is a data throughput desired for the data packet communication with the receiver.

36. The apparatus in claim 32, wherein the first parameter value is a number of outstanding data packets transmitted to the receiver by the transmitter to be acknowledged by the receiver.

37. The apparatus in claim 32, wherein the first parameter is a delay associated with a data packet acknowledgement procedure.

38. The apparatus in claim 37, wherein the delay is an acknowledgment delay denoting a time period between sending a data packet and acknowledgment of receipt of that data packet.

39. The apparatus in claim 38, wherein the acknowledgment delay includes a time to transmit the data packet, process the data packet at the receiver, and receive an acknowledgment.

40. The apparatus in claim 37, wherein the delay is a retransmission delay denoting a time period between sending a data packet and retransmission of that data packet if that data packet requires retransmission.

41. The apparatus in claim 32, wherein the value of the first parameter is determined when the data packet communication is established.

42. The apparatus in claim 32, wherein the value of the first parameter is negotiated by the receiver with the transmitter.

43. The apparatus in claim 32, wherein the receiver is a wireless user equipment.

44. The apparatus in claim 32, wherein the receiver is a radio base station.

45. The apparatus in claim 32, wherein the receiver is coupled to the transmitter by way of a wire or optical fiber link.

46. A receiver with the apparatus claimed in any of claims 32, 36, or 37.

47. A transmitter configured to communicate with the receiver including the apparatus as claimed in any of claims 32, 36, or 37.

48. For use in a communications system where a packet communication is requested between a transmitter and a receiver, apparatus for use in the receiver, comprising:

a buffer for storing data packets received from the transmitter, and a controller for processing received packets stored in the buffer and sending an acknowledgement signal for each received packet in accordance with a data packet acknowledgement procedure, wherein for a particular communication with a transmitter, the controller is configured to determine a value of a first parameter affecting a performance of the data packet acknowledgement procedure, and wherein the value of the first parameter is redetermined after the data packet communication is established when some aspect of the data packet communication has changed from when the data packet communication was originally established.

49. For use in a communications system where a packet communication is requested between a transmitter and a receiver, apparatus for use in the receiver, comprising:

a buffer for storing data packets received from the transmitter, and a controller for processing received packets stored in the buffer and sending an acknowledgement signal for each received packet in accordance with a data packet acknowledgement procedure, wherein for a particular communication with a transmitter, the controller is configured to determine a value of a first parameter affecting a performance of the data packet acknowledgement procedure, wherein the controller is configured to determine a value of a second parameter affecting a performance of the data packet acknowledgement procedure.

50. The apparatus in claim 49, wherein the values of the first and second parameters are determined when the data packet communication is established.

51. The apparatus in claim 50, wherein the values of the first and second parameters are redetermined after the data packet communication is established when some aspect of the data packet communication has changed from when the data packet communication was originally established.

52. The apparatus in claim 49, wherein the values of the first and second parameters are negotiated by the receiver with the transmitter.

53. The apparatus in claim 49, wherein the values of the first and second parameters are determined after the data packet communication is established.

54. The apparatus in claim 49, wherein the first parameter value is a number of outstanding data packets transmitted to the receiver by the sender to be acknowledged by the receiver, and the second parameter is an acknowledgment delay denoting a time period between sending a data packet and acknowledgment of receipt of that data packet.

* * * * *